Oct. 28, 1947. H. R. KRUITBOSCH 2,429,825
WELDING ELECTRODE HOLDER
Filed Dec. 28, 1944

INVENTOR
Harold R. Kruitbosch
BY Darby & Darby
ATTORNEYS

Patented Oct. 28, 1947

2,429,825

UNITED STATES PATENT OFFICE 2,429,825

WELDING ELECTRODE HOLDER

Harold R. Kruitbosch, Bridgeport, Conn., assignor to The Electroloy Company, Incorporated, Bridgeport, Conn., a corporation of Connecticut Application December 28, 1944, Serial No. 570,067

5 Claims. (Cl. 219—4)

1

The present invention relates to welding electrode holders and particularly to such a holder having a provision for ejecting the welding tip.

More particularly still the invention relates to means for ejecting the welding tip from a welding electrode holder which is provided with cooling means without affecting the sealing of the cooling means and causing leakage of the cooling fluid. In the past welding tips or electrodes were held in position by being formed with a taper which was driven into a tapered portion of the holder. Frequently in removing the tip it was damaged to such an extent that it could not be used again and an attempt was made to overcome this disadvantage by providing means for ejecting the tip. An example of such a means is shown in Cox Patent 2,271,119 but the device of this patent is unsatisfactory in that leakage of the cooling fluid occurs due to the use of packing material which becomes worn and is not satisfactory.

My present invention provides a means for ejecting a welding tip or electrode from its holder while at the same time providing a construction of the holder which prevents all leakage of the cooling fluid therefrom.

It is the principal object of the present invention to provide a welding electrode holder adapted to be readily cooled by a cooling fluid and in which means are provided for ejecting the welding electrode from the holder, the construction being such that no leakage of the cooling fluid results from the construction of the electrode ejecting means.

Other objects of the invention will appear from the following description when considered in connection with the appended drawings in which—

Figure 1:
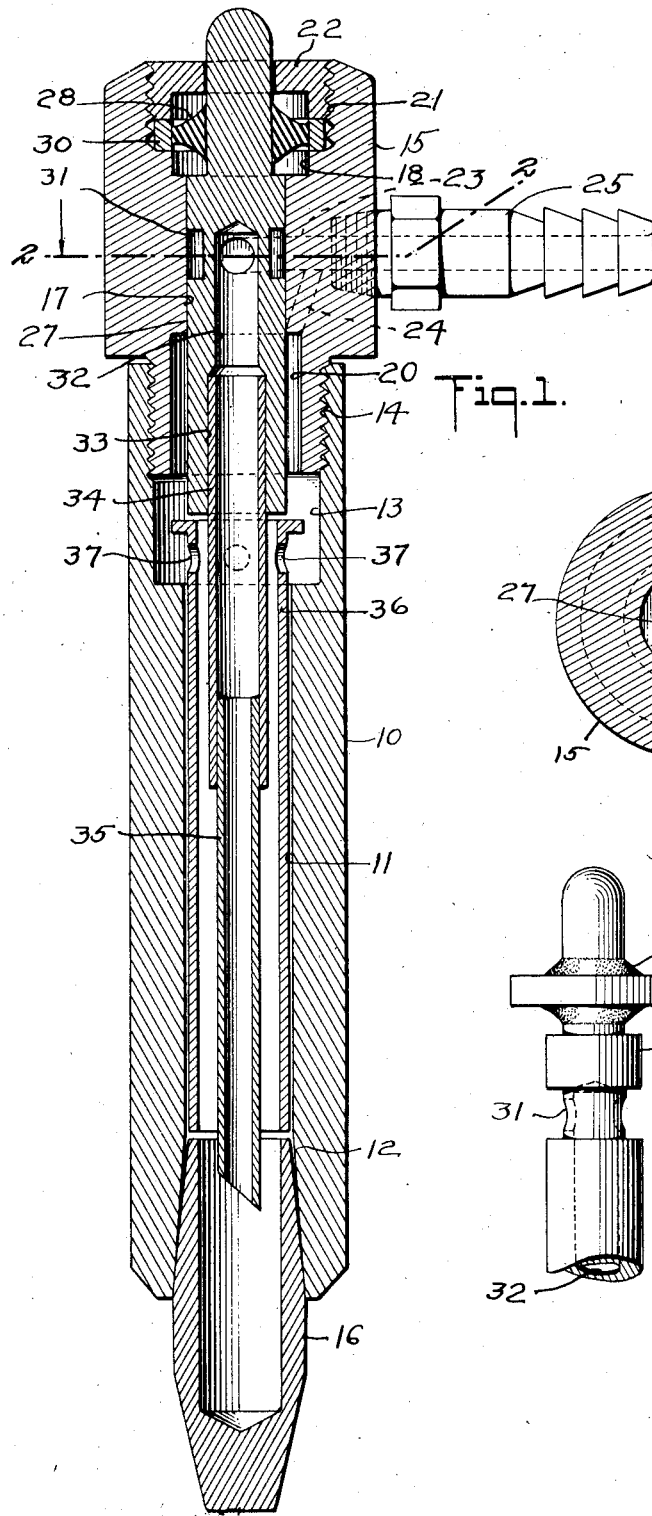
Figure 1 is a longitudinal cross-sectional view of the welding electrode holder of my invention.

Referring now to Figure 1, there is shown at 10 the body of the electrode holder, which body is preferably made of copper or of an alloy having a high percentage of copper therein. The body 10 is generally cylindrical in form and has a bore 11 therein, said bore being tapered as is indicated at 12 at its lower end and enlarged as indicated at 13 at its upper end. Furthermore, the bore is threaded at 14 to cooperate with a cap member 15 in a manner which will be hereinafter described.

The welding tip 16 is provided with a taper at its inner end which taper is somewhat greater than that of the portion 12 of the body member 10 so that the tip may be driven into the taper 12 and will be held tightly therein.

The cap member 15 has a bore 17 therein which bore is enlarged at its ends, as indicated at 18 and 20. The lower portion of the cap member 15 is reduced and threaded to fit into the upper portion of the body member 10, the threads thereof mating with the threads 14 of that member. The bore 18 in cap member 15 is enlarged being formed with a sharp shoulder between its walls and the walls 21 of a further enlarged portion. The further enlarged portion 21 is threaded and the threads thereof mate with threads on a nut 22.

Cap member 15 is provided with ducts 23 and 24 (see Figure 2) through which the cooling medium flows, as will hereinafter be described. The cap member 15 is provided with two hose nipples 25 and 26 which thread into the cap member 15 and cooperate respectively with the ducts 23 and 24. Inserted in the bore 17 of the cap member 15 is a plunger 27 which plunger has bonded thereto a rubber washer 28, the periphery of which is in turn bonded to a metal washer or ring 30. The ring 30 is held against the shoulder between the bores 18 and 21 by means of the nut 22 already described. By virtue of this construction, it will be seen that the plunger 27 may be moved with respect to the cap 15 and, therefore, with respect to the body 10, but there can be no leakage of cooling fluid around the plunger since the rubber washer is bonded at its inner periphery to the plunger 27 and at its outer periphery to the washer or ring 30 which may be forced into intimate contact with the shoulder by means of the nut 22.

Figure 2:
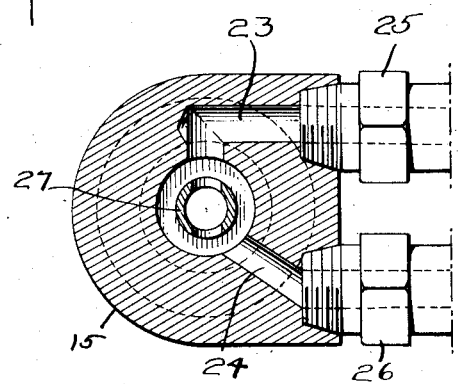
Figure 2 is a transverse cross-sectional view of the welding electrode holder taken on the plane of the line 2—2 of Figure 1.
Figure 3:
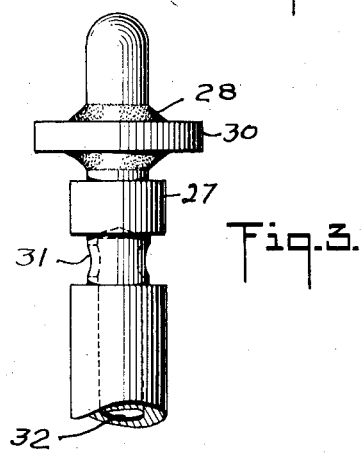
Figure 3 is a fragmentary elevational view of a portion of the electrode ejecting means.

As shown in the drawing, and particularly in Figures 1 and 2, plunger 27 is grooved at 31 and holes are provided extending from the base of this groove into the plunger, the plunger being hollow from its lower end to a point substantially in alignment with the upper end of the groove 31, as seen in Figure 2.

The bore which provides this hollow condition of the plunger is designated 32 and this bore is enlarged at its lower end, as indicated at 33, to provide a seat for a tube 34 which is a force fit in the bore 33. The groove 31 is, when the parts are in their normal position, in alignment with the transversely extending portion of the inlet duct 23.

A second tube 35 is inserted into the lower end of the tube 34 and is of such a diameter as to give a close sliding fit whereby the position of the tube 35 with respect to the tip or electrode 16 may be adjusted.

Before assembling the equipment thus far described, there is inserted in the bore 11 of the body 10, a tube or sleeve 36 the lower termination of which abuts the inner end of the electrode 16. The upper end of the sleeve 36 lies adjacent the inner end of the plunger 27 and both are within the enlarged bore 13 of the body member 10. Further the sleeve 36 is provided with holes 37 which permit passage of cooling fluid from the interior of the sleeve 36 into the space formed by the bore 13 and thence into an enlarged bore 20 at the lower end of the cap member 15 and through the duct 24 to the hose nipple 26.

It will be seen that by virtue of the construction described above cooling fluid, as, for example, water, may enter through the hose nipple 25 and duct 23 and may flow thence through the groove 31 in plunger 27 and the holes at the base of this groove to the interior of tubes 34 and 35, and thence into the hollow inner portion of the welding electrode or tip 16. From here the water flows upwardly through the annular space between sleeve 36 and tube 35, and through the holes 37 into the space created by enlarged bore 13, thence through the annular space provided by the plunger 27 and the enlarged bore 20 of the cap member 15 to the outlet duct 27 and to a hose or the like connected to nipple 26. In order to remove the welding electrode 16, it is only necessary to strike the end of plunger 27 a blow, for example, with a hammer. When so struck the plunger 27 moves inwardly and the lower end strikes the upper end of the sleeve 36. Thus the sleeve 36 is caused to move downwardly and to impinge upon the inner ends of the welding tip 16. The blow thus given to the tip 16 ejects it from the holder. It will be clear that due to the bonding of the rubber washer or ring 28 to both the plunger 27 and the metal washer or ring 30 there can be no leakage around the plunger to the exterior of the cap member. Further the cap member is threadedly connected by means of pipe threads to the body member 10 and these threads may be treated with pipe compound or the like so that there can never be any leakage through this joint. Moreover, since the tip 16 is a force taper fit in the body member 10 there can be no leakage at this point and, consequently, the flow of cooling fluid hereinabove described is accomplished without any leakage whatsoever.

The arrangement of the inlet and outlet connections as, for example, nipples 25 and 26, in alignment transversely of the cap is advantageous since it decreases the overall length of the cap and consequently of the electrode holder and makes it possible to use the holder in situations in which a holder having the inlet and outlet connections in longitudinal alignment is not usable.

While I have described a preferred embodiment of my invention many other forms and modifications are possible and, therefore, I do not desire to be limited to the description given herein solely for the purposes of illustration but rather to be limited only by the scope of the appended claims.

What is claimed is:

1. In a holder for a welding electrode, in combination, a body member having a bore therein, said bore being tapered to hold the welding electrode, a cap for said body member, said cap being located at the opposite end of said member from the electrode, and being threaded into an enlarged portion of the bore in said body member to form a fluid tight seal, a plunger slidably mounted in a bore in said cap, said plunger having an axial bore therein, an enlarged bore in said cap at the end adjacent said body member, a groove in said plunger in alignment with the termination of the axial bore therein and communicating therewith, passageways extending from the exterior of said cap to said groove and to said enlarged bore whereby a cooling medium may pass through said axial bore of said plunger to the welding electrode and may return through said enlarged bore of said cap and the second passageway to the exterior of the cap, a second enlarged bore at the opposite end of the cap, a resilient rubber washer bonded to said plunger, a ring bonded to said rubber washer and means for holding said ring in fluid tight relationship to said second enlarged bore said resiliency of said washer permitting said plunger to be moved axially of said cap and said body member to thereby eject the welding electrode from said body member.

2. In a holder for a welding electrode, in combination, a body member having means for holding said welding electrode and having an axial passage therethrough, a cap fitted to said body member at the end opposite said welding electrode, a sleeve slidably mounted in said body member, a plunger slidably mounted in said cap, said plunger being in axial alignment with said sleeve, a blind bore extending axially of said plunger and open at the end adjacent said body member, a groove in said plunger adjacent the other end of said blind bore, means connecting said groove with said blind bore, an enlarged bore in said cap member at the end thereof adjacent said body member, said enlarged bore forming an annular passage around said plunger, passageways extending from the exterior of said cap to said groove and said enlarged bore to permit ingress and egress of cooling fluid to said body member and said welding electrode, said passageways being in transverse alignment at their outer ends, and means for connecting said passageways to a source of and drain for cooling fluid.

3. In a holder for a welding electrode, in combination, a body member having means for holding said welding electrode at one end thereof and having an axial passage therethrough, a cap fitted to said body member at the end opposite said welding electrode, a sleeve slidably mounted in said body member, a plunger mounted for axial movement in said cap, said plunger being in axial alignment with said sleeve, an inner tubular member fixed in said plunger bore, means for circulating a cooling fluid through said cap and inner tubular member to said welding electrode, means for returning said cooling fluid through said body member between said tubular member and said sleeve to said cap, and means comprising transversely aligned passageways extending from the exterior to the interior of said cap for supplying cooling fluid to said sleeve and for draining the cooling fluid from said cap externally of said sleeve.

4. In a holder for a welding electrode, in combination, a body member having a bore therethrough, said bore being tapered at one end to hold a welding electrode, a cap for said body member, said cap being located at the opposite end of said body member from said welding electrode and being held in fixed relationship to said body member, a sleeve slidably mounted in said body member, a plunger mounted for axial movement in said cap, said plunger being in axial alignment with said sleeve, an axial blind bore in said plunger, an inner tubular member fixed in the bore of said plunger, said member extending through said sleeve and serving to conduct cooling fluid to the electrode, an enlarged bore in said cap at the end adjacent said body member, passageways through said sleeve communicating with said enlarged bore, a groove in the said plunger in alignment with the termination of the axial blind bore therein and communicating therewith, passages extending from the exterior of said cap to said groove and to said enlarged bore in said body member whereby a cooling fluid may pass through said axial bore of said plunger to the welding electrode and may return through the annular passageway between said sleeve and said inner tubular member through the second passageway to the exterior of the cap, a second enlarged bore at the opposite end of said cap, a resilient rubber washer bonded to said plunger, a metal ring bonded to the exterior surface of said rubber washer, and means for holding said ring in fluid-tight relationship to said second enlarged bore, said resiliency of said washer permitting said plunger to be moved axially of said cap and said body member to thereby eject the welding electrode from said body member.

5. In a holder for a welding electrode, in combination, a body member having means for holding said welding electrode at one end thereof and having an axial passage therethrough, a cap fitted to said body member at the end opposite said welding electrode, a sleeve slidably mounted in said body member, a plunger mounted for axial movement in said cap, said plunger being in axial alignment with said sleeve, an inner tubular member fixed in said plunger bore, a tube telescoped within the outer end of said tubular member and in frictional engagement therewith whereby the position of said tube with respect to said welding electrode may be adjusted, means for circulating a cooling fluid through said cap, inner tubular member, and tube to said welding electrode, means for returning said fluid through said body member between said tube and tubular member and said sleeve to said cap, and means comprising passageways transversely aligned at their outer ends and extending from the exterior to the interior of said cap for supplying cooling fluid to said electrode and for draining the cooling fluid from said electrode.

HAROLD R. KRUITBOSCH.

REFERENCES CITED

The following references are of record in the file of this patent:

UNITED STATES PATENTS

| Number | Name | Date |
|---|---|---|
| 2,271,119 | Cox et al. | Jan. 27, 1942 |
| 2,385,108 | Seeloff | Sept. 18, 1945 |